(12) United States Patent
Pietila et al.

(10) Patent No.: US 10,280,824 B2
(45) Date of Patent: May 7, 2019

(54) VARIABLE TAIL PIPE VALVE SYSTEM

(71) Applicant: GM GLOBAL TECHNOLOGY OPERATIONS LLC, Detroit, MI (US)

(72) Inventors: Glenn Pietila, Howell, MI (US); John Pierce, III, Huntington Woods, MI (US); Gerald J. Clark, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 15/453,275

(22) Filed: Mar. 8, 2017

(65) Prior Publication Data

US 2018/0258825 A1    Sep. 13, 2018

(51) Int. Cl.
*F01N 3/021* (2006.01)
*F01N 9/00* (2006.01)
*F01N 11/00* (2006.01)
*F01N 13/08* (2010.01)
*F01N 13/00* (2010.01)

(52) U.S. Cl.
CPC ............ *F01N 13/082* (2013.01); *F01N 3/021* (2013.01); *F01N 9/002* (2013.01); *F01N 11/00* (2013.01); *F01N 13/011* (2014.06); *F01N 2240/36* (2013.01); *F01N 2260/14* (2013.01); *F01N 2410/10* (2013.01); *F01N 2900/0416* (2013.01); *F01N 2900/1606* (2013.01); *Y02T 10/20* (2013.01); *Y02T 10/47* (2013.01)

(58) Field of Classification Search
CPC ........ F01N 3/021; F01N 3/0235; F01N 11/00; F01N 13/082; F01N 2260/14
See application file for complete search history.

(56) References Cited

U.S. PATENT DOCUMENTS

| | | | | |
|---|---|---|---|---|
| 2004/0194454 A1* | 10/2004 | Rim | ...................... | F01N 3/0253 60/297 |
| 2008/0178576 A1* | 7/2008 | Meier | ..................... | F01N 3/031 60/277 |
| 2014/0026874 A1* | 1/2014 | Dean | ....................... | F02D 21/08 123/568.21 |
| 2015/0240681 A1* | 8/2015 | Fritz | ........................ | F01N 3/031 60/274 |

\* cited by examiner

*Primary Examiner* — Audrey K Bradley
(74) *Attorney, Agent, or Firm* — Cantor Colburn LLP

(57) ABSTRACT

An exhaust system includes a particulate filter, a variable valve, and a controller communicatively connected to the variable valve. The controller is operative to determine a backpressure caused by the particulate filter in the exhaust system, and control a position of the variable valve as a function of the backpressure caused by the particulate filter.

20 Claims, 4 Drawing Sheets

VARIABLE TAIL PIPE VALVE SYSTEM

INTRODUCTION

The subject application relates to exhaust systems.

Exhaust systems for internal combustion engines often include an arrangement of tubing that directs exhaust gases away from the engines.

To make combustion gasses environmentally cleaner, some exhaust systems include a particulate filter or other types of filters or devices that are operative to improve the cleanliness of the engine exhaust.

One parameter of system design that affects system performance is exhaust backpressure. Exhaust back pressure is generally increased as flow of exhaust gasses in the exhaust system is restricted. Filters, mufflers, and other devices in the exhaust system generally increase the exhaust back pressure.

Generally, as exhaust backpressure increases, system performance parameters are degraded. In this regard, in many systems, power/torque, and fuel consumption performance are degraded when exhaust backpressure is increased.

It is desirable for combustion systems to reduce system exhaust backpressure while maintaining other performance parameters above or below desired thresholds.

SUMMARY

According to an exemplary embodiment, an exhaust system includes a particulate filter, a variable valve, and a controller communicatively connected to the variable valve. The controller is operative to determine a backpressure caused by the particulate filter in the exhaust system, and control a position of the variable valve as a function of the backpressure caused by the particulate filter.

In addition to one or more of the features described herein, or as an alternative, further embodiments include wherein the particulate filter is operative to trap exhaust particulates in the exhaust system.

In addition to one or more of the features described herein, or as an alternative, further embodiments include wherein the variable valve includes a variable tailpipe valve that is operable control a flow of exhaust gas therethrough by varying a position of the variable valve over a range of positions between an open and a substantially closed valve position.

In addition to one or more of the features described herein, or as an alternative, further embodiments include wherein system further comprises a sensor communicatively connected to the controller, the sensor operative to sense the backpressure in the system.

In addition to one or more of the features described herein, or as an alternative, further embodiments include wherein the controller is operative to determine the backpressure caused by the particulate filter by receiving a signal from a sensor.

In addition to one or more of the features described herein, or as an alternative, further embodiments include wherein the controller is operative to determine the backpressure caused by the particulate filter by estimating a loading of the particulate filter by particulates as a function of a duty cycle of the particulate filter.

In addition to one or more of the features described herein, or as an alternative, further embodiments include wherein the controller is operative to move an angular position of the variable valve to an open position to reduce backpressure in the system responsive to identifying an increase in backpressure caused by loading of the particulate filter.

According to another embodiment, a method for controlling an exhaust system includes detecting a backpressure in the exhaust system, calculating an effect of backpressure on a system performance parameter, and determining whether the backpressure results in exceeding the system performance parameter. The method further comprises controlling a position of a variable valve to control the backpressure such that the backpressure does not result in exceeding the system performance parameter.

In addition to one or more of the features described herein, or as an alternative, further embodiments include wherein the backpressure in the exhaust system is caused by a particulate filter.

In addition to one or more of the features described herein, or as an alternative, further embodiments include wherein the detecting the backpressure in the exhaust system includes detecting the backpressure in a particulate filter that is operative to trap exhaust particulates in the exhaust system.

In addition to one or more of the features described herein, or as an alternative, further embodiments include wherein the variable valve includes a variable tailpipe valve that is operable to control a flow of exhaust gas therethrough by varying a position of the variable valve over a range of positions between an open and a substantially closed valve position.

In addition to one or more of the features described herein, or as an alternative, further embodiments include wherein the backpressure in the exhaust system is detected using a sensor.

In addition to one or more of the features described herein, or as an alternative, further embodiments include wherein the backpressure is calculated by estimating a loading of a particulate filter by particulates as a function of a duty cycle of the particulate filter.

In addition to one or more of the features described herein, or as an alternative, further embodiments include moving an angular position of the variable valve to an open position to reduce backpressure in the system responsive to identifying an increase in backpressure caused by loading of the particulate filter.

According to yet another exemplary embodiment, a method for controlling an exhaust system includes estimating a backpressure in the exhaust system, calculating an effect of backpressure on a system performance parameter, and determining whether the backpressure results in exceeding the system performance parameter. The method further comprises controlling a position of a variable valve to control the backpressure such that the backpressure does not result in exceeding the system performance parameter.

In addition to one or more of the features described herein, or as an alternative, further embodiments include wherein the backpressure in the exhaust system is caused by a particulate filter.

In addition to one or more of the features described herein, or as an alternative, further embodiments include wherein the detecting the backpressure in the exhaust system includes detecting the backpressure in a particulate filter that is operative to trap exhaust particulates in the exhaust system.

In addition to one or more of the features described herein, or as an alternative, further embodiments include wherein the variable valve includes a variable tailpipe valve that is operable to control a flow of exhaust gas therethrough by varying a position of the variable valve over a range of positions between an open and a substantially closed valve position.

In addition to one or more of the features described herein, or as an alternative, further embodiments include wherein the backpressure is estimated by estimating a loading of a particulate filter by particulates as a function of a duty cycle of the particulate filter.

In addition to one or more of the features described herein, or as an alternative, further embodiments include further comprising moving an angular position of the variable valve to an open position to reduce backpressure in the system responsive to identifying an increase in backpressure caused by loading of the particulate filter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Exhaust systems for internal combustion engine systems often include tubing that defines a flow path for engine exhaust gases and particulates, which directs exhaust gases away from the engine.

Previous exhaust systems included exhaust tubing, and a muffler or other sound dampening device that defined the exhaust flow path. Some systems include one or more particulate filters that are operative to remove particulates from the exhaust gasses.

The components of the exhaust systems tend to restrict the flow of the exhaust gasses. Restrictions in flow tend to result in backpressure in the system, which often results in a reduction in torque or power and fuel economy.

Though backpressure is generally a system performance parameter that should be minimized to increase engine performance, other performance characteristics improve with increased backpressure due to system improvements (e.g., mufflers and filters).

It is desirable to balance or optimize the system such that engine performance parameters such as power and fuel efficiency maintain above a desired threshold, while engine noise is maintained below a desired threshold.

Such a balancing is often performed when the system is designed using the known parameters of the system. In previous exhaust systems, the backpressure in the system would remain substantially the same throughout the duty cycle of the system since the geometry of such systems is generally fixed. However, when a particulate filter is added to the exhaust system, the particulate filter will trap particulates in the filter, which continuously increases the backpressure in the system until the filter is cleaned or replaced.

Thus, it is desirable for an exhaust system to control backpressure as the particulate filter or other system components periodically or continually increase the backpressure in the system through operation.

The systems and methods described herein provide for a variable tailpipe valve (valve) arranged proximate to the tailpipe (or another orifice in the exhaust system where exhaust gasses are emitted into the atmosphere) that has variable positions. The positions of the valve affect the backpressure in the system. For example, when the valve is in a more open position, the backpressure induced by the valve is reduced, while the valve in a more closed position increases the backpressure in the system. The valve provides a means controlling backpressure of the exhaust system by increasing or decreasing the angle of the variable valve over a range of positions between open and substantially closed.

Figure 1:
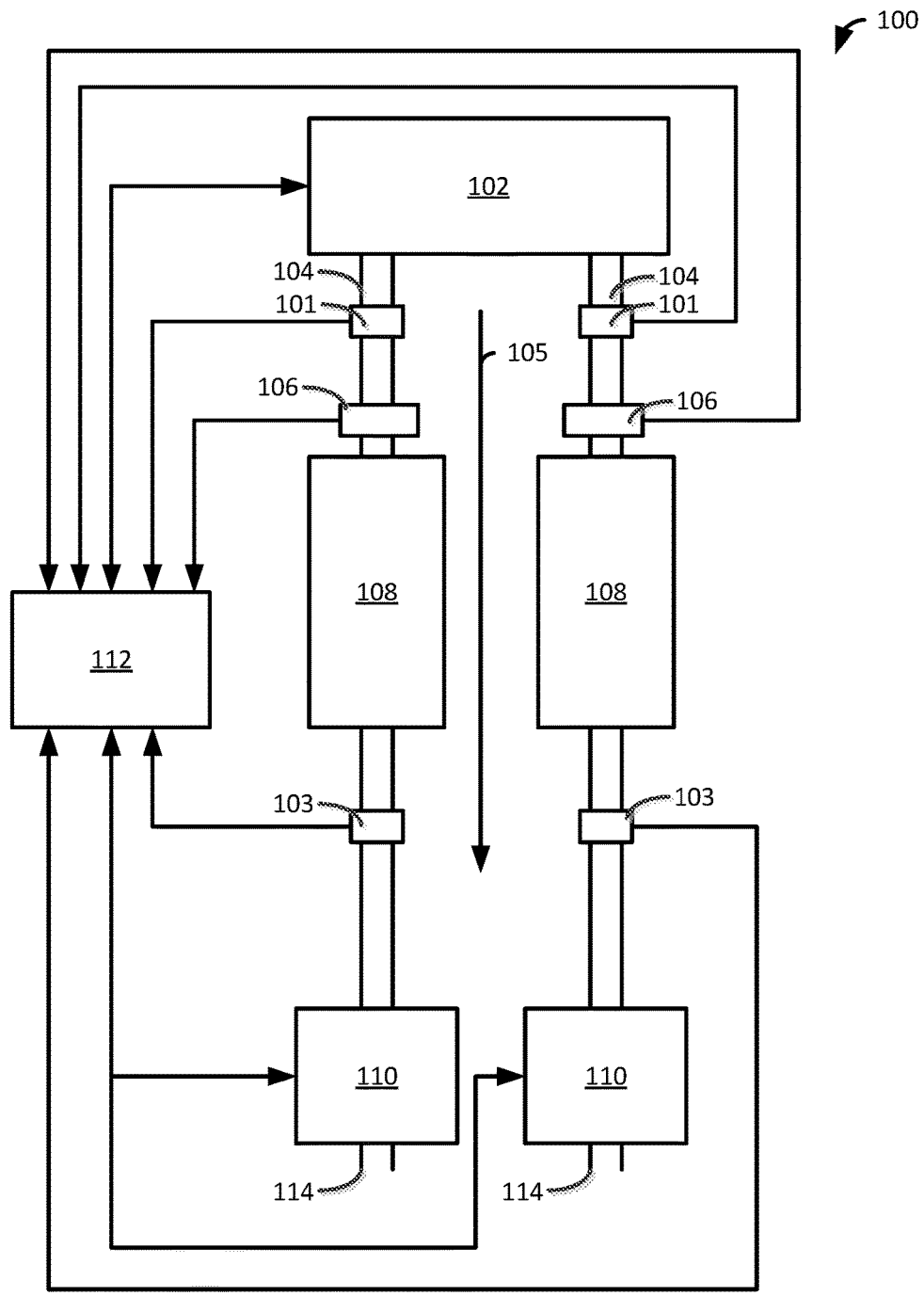
FIG. 1 illustrates an exemplary embodiment of an exhaust system.

FIG. 1 illustrates an exemplary embodiment of an exhaust system (system) 100. Though the illustrated exemplary embodiment of the exhaust system 100 includes a dual exhaust system (two flow paths), the exemplary embodiments are not limited to any number of flow paths. The system 100 is connected to an engine 102 that emits exhaust gasses through an exhaust flow path partially defined by exhaust tubing 104. The arrow 105 indicates the direction of the exhaust gas flow. The engine 102 is upstream from a particulate filter 106 and muffler 108. While a variable tailpipe valve 110 is downstream of the engine 102 and the particulate filter 106.

The system 100 includes particulate filter 106 that is operative to remove regulated particulates from the exhaust gas before the exhaust gas exits the tailpipe 114. The particulate filter 106 traps exhaust particles. Through the duty cycle of the particulate filter 106, the particulate filter 106 becomes more loaded with trapped particulates. As the loading increases, the particulate filter 106 increases the restriction in the exhaust system. In other words, the longer the filter remains in service, prior to cleaning or regeneration, the greater the filter loading and resultant backpressure increase. Some particulate filters 106 may be periodically disposed or cleaned by a service technician. Other particulate filters 106 may self-clean periodically.

A muffler 108 is arranged prior to the tailpipe 114 to reduce the noise emitted from the system 100. A variable tailpipe valve (valve) 110 is arranged proximate to the tailpipe 114. The variable tailpipe valve is communicatively connected to a controller 112.

In some exemplary embodiments, backpressure sensors 101 and/or 103 may be communicably connected to the controller 112 to provide the controller 112 with backpressure measurements in various locations in the exhaust system 100. The controller 112 may be communicatively connected to the engine 102, and in some embodiments the particulate filter 106.

Figure 2:
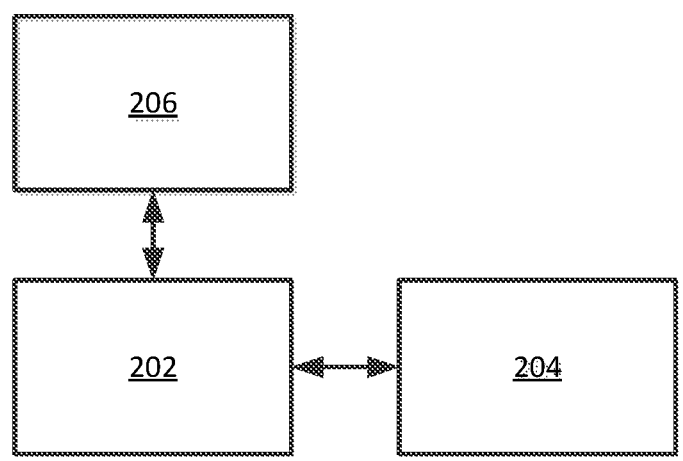
FIG. 2 illustrates a block diagram of an exemplary embodiment of the controller of FIG. 1.

FIG. 2 illustrates a block diagram of an exemplary embodiment of the controller 112 (of FIG. 1). In the illustrated exemplary embodiment, the controller 112 includes a processor 202 that is communicatively connected to a memory 204 and an input/output (I/O) device 206. In operation, the processor 202 is operative to receive and send signals from the I/O device 206 and store and retrieve data to and from the memory 204.

Figure 3:
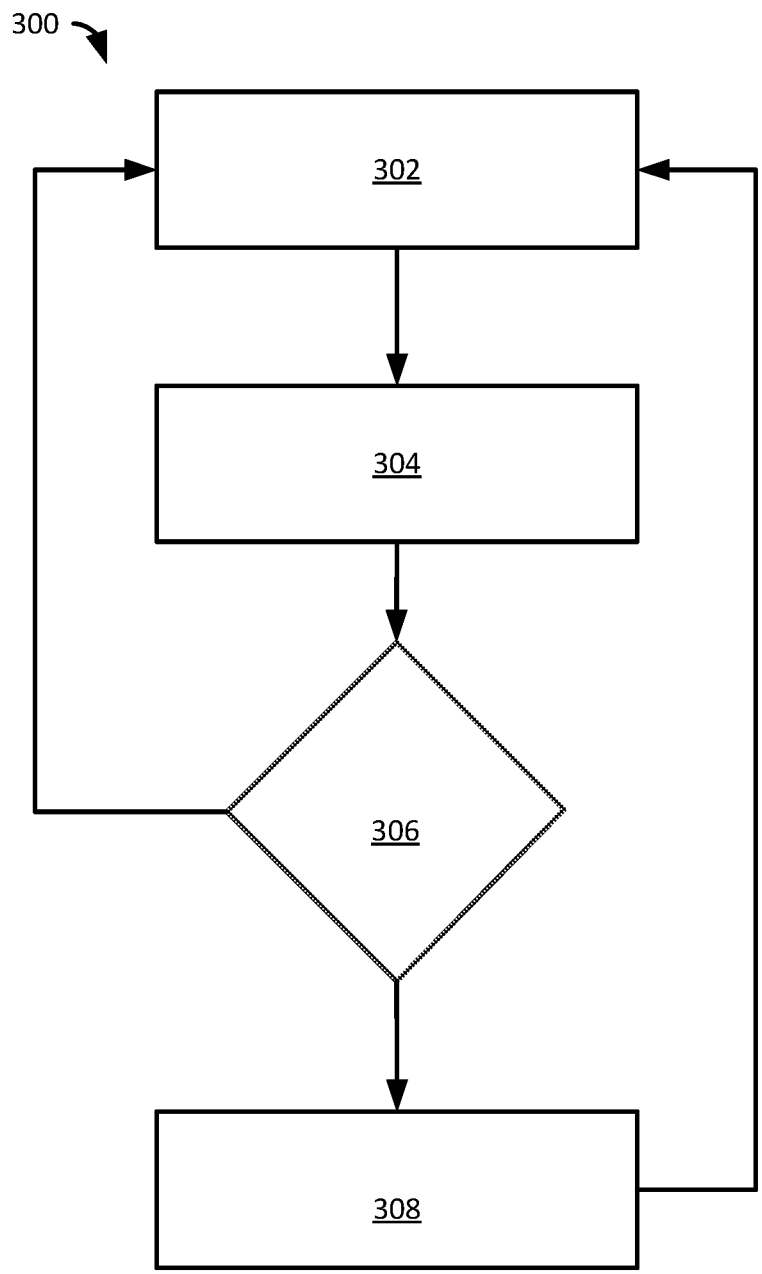
FIG. 3 illustrates a block diagram of an exemplary method of controlling the system of FIG. 1.

FIG. 3 illustrates a block diagram of an exemplary method 300 of controlling the system 100 (of FIG. 1). In block 302, the controller 112 detects or identifies the system backpressure. The system 100 backpressure may be detected by, for example, receiving a signal from the sensors 101 and/or 103 indicative of the backpressure in the system 100.

Alternatively, system backpressure may be identified or estimated by a suitable estimation method. For example, over the duty cycle of the particulate filter 106, the backpressure caused by the particulate filter will increase as the filter traps more exhaust particulates. Such an increase in backpressure over the duty cycle of the particulate filter 106 may be estimated using, for example, a lookup table or calculated using a function that estimates the system backpressure as a function of the duty cycle of the particulate filter 106. Such functions and tables may be generated by system performance testing, modeling, and optimizing.

In block 304, the effect of the backpressure on the system performance parameters is calculated or determined. As discussed above, as the system backpressure increases, the power and fuel efficiency of the system tends to decrease. However, noise emissions from the system 100 are also affected by backpressure where generally noise tends to increase as backpressure decreases.

In block 306, the controller 112 determines whether the backpressure (BP) results in exceeding performance thresholds (e.g., a higher backpressure decreases the system power below a desired performance threshold). If no, the controller 112 continues to monitor the system backpressure. If yes, in block 308 the controller 112 controls the position of the variable control valve to increase or decrease the backpressure in the system 100, such that the system meets the performance thresholds.

The variable valve 110 (of FIG. 1) in the illustrated exemplary embodiment has any number of valve positions that are defined by an angular position of the variable valve 110. Thus, the angle of the variable valve 110 affects the backpressure in the system 100.

Figure 4:
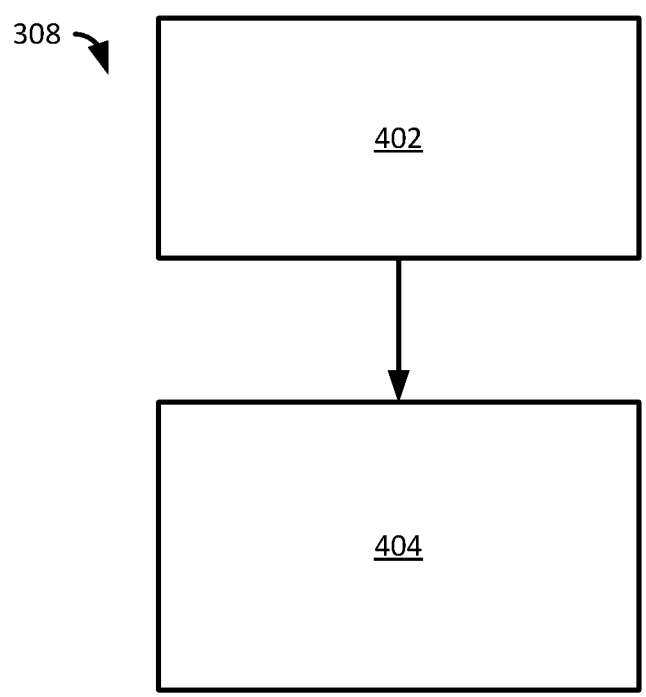
FIG. 4 illustrates a block diagram of an exemplary method for controlling the variable valve.

FIG. 4 illustrates a block diagram of an exemplary method for controlling the variable valve 110 (FIG. 1) as described in block 308 (of FIG. 3). In this regard, during system design, the angle offset (bias values) of the position of the variable valve 110 is calculated to meet performance parameter targets of both a restricted and an unrestricted system in block 402.

During operation of the system 100, when the back pressure results in exceeding performance thresholds (in block 308 of FIG. 3), the controller 112 (of FIG. 1) controls the variable valve 110 to meet the performance thresholds by adjusting the bias value of the variable valve 110 position by interpolating between the bias value for the restricted and unrestricted systems in block 404.

The systems and methods described herein provide using a variable tailpipe valve to control the backpressure caused by loading an exhaust particulate filter with particulates during the duty cycle of the filter. Such loading increases the backpressure in the exhaust system, and reduces the performance of the engine system. The backpressure is controlled by adjusting the position of the variable tailpipe valve to increase or decrease the backpressure in the system as a function of the backpressure caused by the particulate filter.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the application not be limited to the particular embodiments disclosed, but will include all embodiments falling within the scope of the application.

What is claimed is:

1. An exhaust system comprising:
    a particulate filter;
    a variable valve; and
    a controller communicatively connected to the variable valve, the controller operative to:
    detect a backpressure in the exhaust system;
    calculate an effect of backpressure on a system performance parameter;
    determine whether the backpressure results in exceeding the system performance parameter; and
    control a position of the variable valve to control the backpressure such that the backpressure does not result in exceeding the system performance parameter.

2. The system of claim 1, wherein the particulate filter is operative to trap exhaust particulates in the exhaust system.

3. The system of claim 1, wherein the variable valve includes a variable tailpipe valve that is operable to control a flow of exhaust gas therethrough by varying a position of the variable valve over a range of positions between an open and a substantially closed valve position.

4. The system of claim 1, wherein the system further comprises a sensor communicatively connected to the controller, the sensor operative to sense the backpressure in the system.

5. The system of claim 1, wherein the controller is operative to determine the backpressure caused by the particulate filter by receiving a signal from a sensor.

6. The system of claim 1, wherein the controller is operative to determine the backpressure caused by the particulate filter by estimating a loading of the particulate filter by particulates as a function of a duty cycle of the particulate filter.

7. The system of claim 1, wherein the controller is operative to move an angular position of the variable valve to an open position to reduce backpressure in the system responsive to identifying an increase in backpressure caused by loading of the particulate filter.

8. A method for controlling an exhaust system, the method comprising:
    detecting a backpressure in the exhaust system;
    calculating an effect of backpressure on a system performance parameter;
    determining whether the backpressure results in exceeding the system performance parameter; and
    controlling a position of a variable valve to control the backpressure such that the backpressure does not result in exceeding the system performance parameter.

9. The method of claim 8, wherein the backpressure in the exhaust system is caused by a particulate filter.

10. The method of claim 8, wherein the detecting the backpressure in the exhaust system includes detecting the backpressure in a particulate filter that is operative to trap exhaust particulates in the exhaust system.

11. The method of claim 8, wherein the variable valve includes a variable tailpipe valve that is operable to control a flow of exhaust gas therethrough by varying a position of the variable valve over a range of positions between an open and a substantially closed valve position.

12. The method of claim 8, wherein the backpressure in the exhaust system is detected using a sensor.

13. The method of claim 8, wherein the backpressure is calculated by estimating a loading of a particulate filter by particulates as a function of a duty cycle of the particulate filter.

14. The method of claim 8, further comprising moving an angular position of the variable valve to an open position to reduce backpressure in the system responsive to identifying an increase in backpressure caused by loading of the particulate filter.

15. A method for controlling an exhaust system, the method comprising:
estimating a backpressure in the exhaust system;
calculating an effect of backpressure on a system performance parameter;
determining whether the backpressure results in exceeding the system performance parameter; and
controlling a position of a variable valve to control the backpressure such that the backpressure does not result in exceeding the system performance parameter.

16. The method of claim 15, wherein the backpressure in the exhaust system is caused by a particulate filter.

17. The method of claim 15, wherein determining the backpressure in the exhaust system includes detecting the backpressure in a particulate filter that is operative to trap exhaust particulates in the exhaust system.

18. The method of claim 15, wherein the variable valve includes a variable tailpipe valve that is operable to control a flow of exhaust gas therethrough by varying a position of the variable valve over a range of positions between an open and a substantially closed valve position.

19. The method of claim 15, wherein the backpressure is estimated by estimating a loading of a particulate filter by particulates as a function of a duty cycle of the particulate filter.

20. The method of claim 15, further comprising moving an angular position of the variable valve to an open position to reduce backpressure in the system responsive to identifying an increase in backpressure caused by loading of the particulate filter.

* * * * *